3,609,975
THROWAWAY MASTER CYLINDER RESERVOIR
Richard L. Lewis, South Bend, and Nicholas C. Blume, Auburn, Ind., assignors to The Bendix Corporation
Filed Feb. 27, 1970, Ser. No. 15,171
Int. Cl. F15b 7/00
U.S. Cl. 60—54.6 R                                    7 Claims

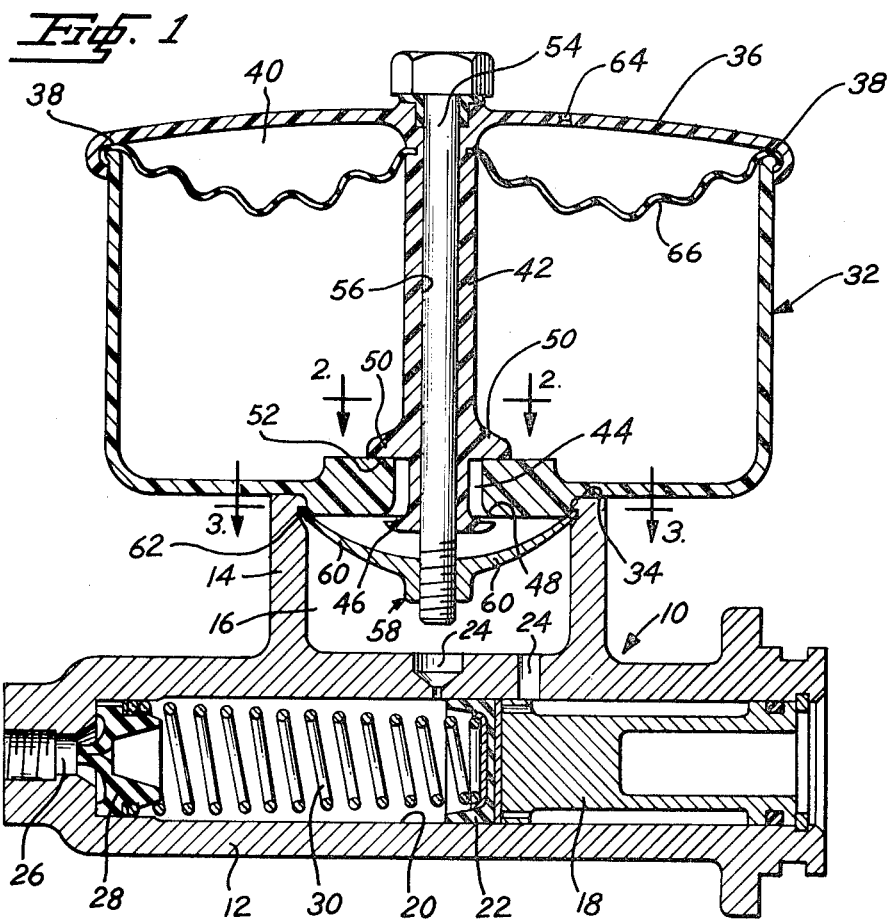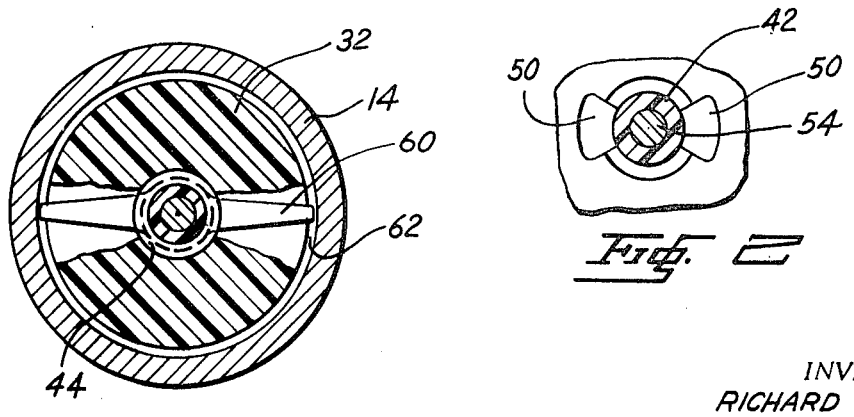

ABSTRACT OF THE DISCLOSURE

A replaceable fluid reservoir for a brake master cylinder has a fluid outlet communicating with a master cylinder bore. A resilient closure for the reservoir normally biases a valve stem toward a position closing the outlet. A bolt securing the reservoir to the housing opposes the resiliency of the closure to urge the valve stem toward a position allowing fluid communication between the reservoir and the bore.

BACKGROUND OF THE INVENTION

This invention relates to a replaceable fluid reservoir for a brake master cylinder.

Most vehicles utilize master cylinders having an integral brake fluid reservoir. To replenish the fluid in the reservoir, it is necessary to remove the reservoir cap and pour brake fluid into the reservoir from a separate container. Since the contents of an entire container are rarely required to fill a single master cylinder, open containers are often stored at service stations for long periods of time, often resulting in contamination of the brake fluid. It is therefore desirable to provide a master cylinder that uses a replaceable reservoir, so that the depleter reservoir may be removed from the master cylinder and replaced with a filled, sealed reservoir.

Replaceable fluid reservoirs have been proposed before, but such devices suffer the disadvantage of being rather costly and are susceptible to leakage problems while in transit and when secured to a master cylinder. Previous devices have required quite complicated valving structures to insure proper sealing.

SUMMARY OF THE INVENTION

Therefore, an important object of our invention is to provide a master cylinder fluid reservoir that may be easily fabricated at low cost.

Another important object of our invention is to provide a replaceable reservoir having a minimum of parts.

Another important object of our invention is to simplify fastening of the reservoir to the master cylinder.

Yet another important object of our invention is to simplify the valving structure necessary in prior art devices.

Still another important object of our invention is to insure a leak-tight reservoir that may be stored indefinitely prior to installation of the latter on a master cylinder housing.

Still another important object of our invention is to provide a reservoir that seals tightly against a master cylinder housing when installed thereon.

DESCRIPTION OF THE DRAWINGS

FIG. 1 is a longitudinal cross-sectional view of a master cylinder and reservoir made pursuant to my present invention;

FIG. 2 is a fragmentary, cross-sectional view taken along line 2—2 of FIG. 1; and FIG. 3 is a fragmentary, cross-sectional view taken substantially along line 3—3 of FIG. 1 and is illustrated with a portion of the lower surface of the reservoir broken away to show the structure which attaches the reservoir to the master cylinder.

DETAILED DESCRIPTION

Referring now to the drawing, a master cylinder 10 includes a housing 12 having a cylindrical flange 14 extending therefrom defining a fluid inlet chamber 16. A piston 18 is reciprocable in the bore 20 of the housing 12, and is sealed in the bore by a sealing cup 22. Inlet ports 24 establish fluid communication between the inlet chamber 16 and the bore 20. An outlet port 26 permits connection of the bore 20 with the wheel cylinders (not shown), and is provided with check valve means 28 to prevent backward flow of fluid into the bore 20. A spring 30 is interposed between the check valve means 28 and the piston 18 to bias the latter toward the brake release position at the right side of the bore viewing FIG. 1.

A replaceable vessel 32 containing brake fluid is adapted to be mounted on the flange 14 which sealingly engages the vessel 32 about the annular bottom surface 34 of the latter. A resilient closure 36 sealingly engages, as at 38, the open top or fluid inlet 40 of the vessel 32. An annular valve stem 42 carried by the closure 36 extends through the vessel 32 and projects through a fluid outlet 44 that communicates the fluid content of the vessel 32 with the inlet chamber 16. A circumferentially extending lip 46 projects from the lower portion of the stem 42 and is adapted to engage a valve seat 48 circumscribing the outlet 44 exteriorly of the vessel 32. A pair of arms 50 project radially from the valve stem 42 and are adapted to engage the inner surface 52 of the vessel 32 circumscribing the outlet 44. Engagement of the arms 50 with the surface 52 limits the axial movement of the stem 42 through the outlet 44.

A bolt 54 extends through the bore 56 of the valve stem 42 and engages a nut 58 having a pair of radially projecting wings 60 extending therefrom. The inner periphery of the flange 14 has a circumferentially extending groove 62 extending therearound which is adapted to receive the ends of the wings 60. Engagement of the wings 60 in the notch 62 insures that tightening of the bolt 54 will urge the vessel 32 into sealing engagement with the flange 14.

To prevent collapse of the vessel 32, an air inlet port 64 is provided to fill the vessel 32 with air as the fluid is depleted. Brake fluid being hydroscopic in nature, however, it is necessary to separate the air from the fluid by providing a diaphragm 66.

Before installation on the master cylinder 10, the fluid filled vessel 32 may be transported separately therefrom. In this condition, the resiliency of the closure 36 biases the stem 42 to a position engaging the lip 46 and the seat 48. If necessary, a rupturable seal (not shown) may be provided between the lip 46 and the seat 48 to insure against loss of fluid. A leak-proof reservoir for a reserve brake fluid supply is thus assured, which may be advantageously carried in the luggage compartment of the vehicle and installed by the operator when necessary.

MODE OF OPERATION

When a reservoir is to be installed on the master cylinder, the vehicle operator need only insert the bolt 54 in the bore 56 and install the bolt 54 into the nut 58 that is retained in the notches 62. Upon tightening of the bolt 52 into the nut 58, the action of the bolt 52 against the closure 36 opposes the resiliency of the latter, urging the lip 46 from the seat 48 to permit fluid communication between the vessel 32 and the inlet chamber 16. Downward movement of the stem 42 is limited by engagement of the arms 50 with the surface 52, and further tightening of the bolt 52 thereafter insures sealing engagement of the bottom surface 34 of vessel 32 with the flange 14. This novel method of securing the reservoir to the master cylinder insures sealing engagement of the reservoir with the master cylinder housing and prevents leakage of brake fluid from the reservoir before proper installation. Thus, the reservoir may be easily installed by the vehicle operator, permitting an emergency supply of brake fluid to be carried with the vehicle.

We claim:

1. A replaceable fluid reservoir for a brake master cylinder having an interior bore, said reservoir comprising:
a vessel having an open top and a fluid outlet adapted to communicate the interior of the vessel with said bore;
a resilient closure engaging said top;
a valve extending from said closure cooperating with said outlet to control fluid flow therethrough;
said closure yieldably biasing said valve member toward a position closing said outlet; and
fastening means for securing the vessel to the master cylinder;
said fastening means operatively connected to said valve member to thereby urge said valve member to an open position against the biasing force of said closure when said vessel is secured to said master cylinder.

2. The invention of claim 1:
said outlet including a valve seat circumscribing the same exteriorly of the vessel;
said valve member being a stem extending through said outlet and having a radially projecting lip adapted to engage said seat.

3. The invention of claim 2:
said fastening means interconnecting said closure and said master cylinder;
said fastening means when secured to the master cylinder urging a portion of said closure toward the outlet thereby extending the valve stem from the outlet to disengage the lip from the valve seat.

4. The invention of claim 3:
said valve stem being annular;
said fastening means including a bolt coaxial with said valve stem.

5. In a master cylinder:
a housing defining a bore therewithin;
a vessel having an open top surface and a bottom surface sealingly engaging said housing;
said vessel having a fluid outlet communicating with said bore;
a resilient closure for said open top;
valve means extending from said closure cooperating with said outlet to control fluid flow therethrough;
said closure resiliently biasing said valve means toward a position closing the outlet;
fastening means securing the vessel to the housing;
said fastening means opposing the resiliency of the closure to maintain said valve means in an open position.

6. The invention of claim 5:
said housing having a flange extending therefrom defining a fluid inlet chamber communicating with said vessel;
said flange being notched on its internal periphery;
said fastening means including a bolt extending through said vessel and a nut for said bolt having means engaging said notch.

7. The invention of claim 6:
said outlet including a valve seat circumscribing the same exteriorly of the vessel;
said valve means including a stem having a central bore coaxially receiving said bolt and a lip projecting radially from said stem adapted to engage said seat;
said bolt and nut being adapted to urge a portion of the closure toward the outlet upon tightening of the bolt into the nut thereby forcing said stem through the outlet to disengage the lip from the seat.

References Cited

UNITED STATES PATENTS

| | | | |
|---|---|---|---|
| 2,490,721 | 12/1949 | Via | 222—510 |
| 3,059,671 | 10/1962 | Kings | 60—54.6 |

MARTIN P. SCHWADRON, Primary Examiner

A. M. ZUPCIC, Assistant Examiner

U.S. Cl. X.R.

222—510, 518; 141—330